Figure 2:
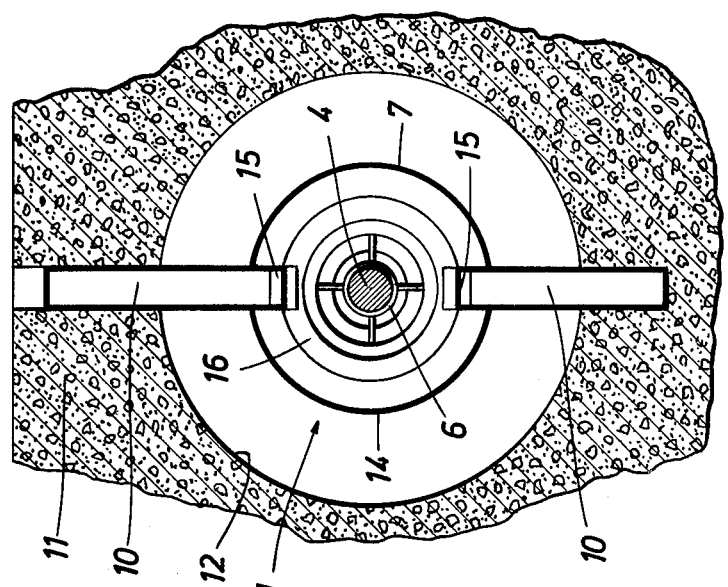

United States Patent [19]

Ziegler

[11] 4,102,599
[45] Jul. 25, 1978

[54] TURBINE-GENERATOR ASSEMBLY, INSTALLATION AND HOUSING

[75] Inventor: Gerhard Ziegler, Graz, Austria

[73] Assignee: Verinigte Österreichische Eisen-und Stahlwerke-Alpine Montan Aktiengesellschaft, Vienna, Austria

[21] Appl. No.: 770,900

[22] Filed: Feb. 22, 1977

[30] Foreign Application Priority Data

Apr. 13, 1976 [AT] Austria .................................. 2712/76

[51] Int. Cl.² ............................................ F03B 11/02
[52] U.S. Cl. ..................................... 415/219 R; 290/52
[58] Field of Search ........... 415/219 R, 291 A, 219 C; 290/52, 1 A; 137/236

[56] References Cited

U.S. PATENT DOCUMENTS

| 2,736,530 | 2/1956 | Koepke | 415/219 R |
| 3,535,540 | 10/1970 | Boulogne | 415/219 R |
| 3,939,357 | 2/1976 | Ziegler | 290/52 |

*Primary Examiner*—Clarence R. Gordon
*Attorney, Agent, or Firm*—Kurt Kelman

[57] ABSTRACT

A central assembly includes a shaft, a generator and a water turbine which are axially spaced apart and non-rotatably connected to said shaft, and bearing means for said shaft. A housing assembly is mounted or adapted to be mounted in a duct structure, which defines a flow passage. The housing assembly comprises a shell, which surrounds or is adapted to surround said central assembly so that said turbine is adapted to receive water from said flow passage, at least two arms, each of which projects radially from said shell and has an outer end which is anchored or adapted to be anchored in said duct structure, and an inner end disposed inside said shell, a plurality of spars, each of which extends in said shell substantially parallel to the axis of said shaft and is rigid with the inner end of one of said arms and has a first end portion disposed or adapted to be disposed near said turbine and a second end portion disposed or adapted to be disposed near said generator, a peripheral reinforcing flange disposed in and rigid with said shell and with said first end of each of said spars, and retaining means disposed in and rigid with said shell and said second end portion of each of said spars, whereby said arms are rigidly interconnected.

4 Claims, 3 Drawing Figures

TURBINE-GENERATOR ASSEMBLY, INSTALLATION AND HOUSING

This invention relates to a housing for duct-mounted turbine-generator assemblies, comprising at least two radial arms, which are anchored in a duct structure and rigidly interconnected and serve to support a central assembly, which is turned around by water and comprises a generator, turbine shaft, shaft bearing means, and turbine.

It has proved satisfactory to support the central assembly by means of rigidly interconnected arms because the resulting carrying structure flexurally stiff and permits of a transmission of the forces and moments arising in the operation of duct-mounted turbine assemblies to the duct structure which defines the flow passage for the driving water, whereas the housing need not be excessively heavy and expensive. The arms have previously been connected by rods, which extend in the longitudinal direction of the arm and approximately diametrally through the interior of the housing. This arrangement involves the disadvantage that walking in the interior of the central assembly is enabled only in a closely confined space and there is only a small freedom of movement for assembling and repair work.

For this reason it is an object of the invention to provide a housing which is of the kind described first hereinbefore and which ensures a satisfactory transmission of forces and torques into the duct structure and provides for a large free interior space whereas it does not substantially add to the structural and material expenditures are not substantially increased.

This object is accomplished according to the invention in that the arms are provided with spars, which are disposed within the housing shell and extend approximately parallel to the axis of the turbine assembly, and each of said spars has an end which is disposed near the turbine and secured to a peripheral reinforcing flange of the housing and another end which is disposed near the generator and secured to a carrier for a thrust bearing for the turbine shaft or also to a peripheral housing flange. The arms, spars, and the housing flange and bearing carrier, or both housing flanges, constitute a bracing structure, which is flexurally stiff and permits of a design of a simple and relatively light-weight housing, which facilitates the walking in its interior. Those elements of the bracing structure which are disposed between the arms virtually constitute a load-carrying cage, which has the required stiffness and leaves the central region around the turbine shaft entirely unobstricted so that work to be performed inside the turbine assembly is not hampered by restrictions of space.

Figure 1:
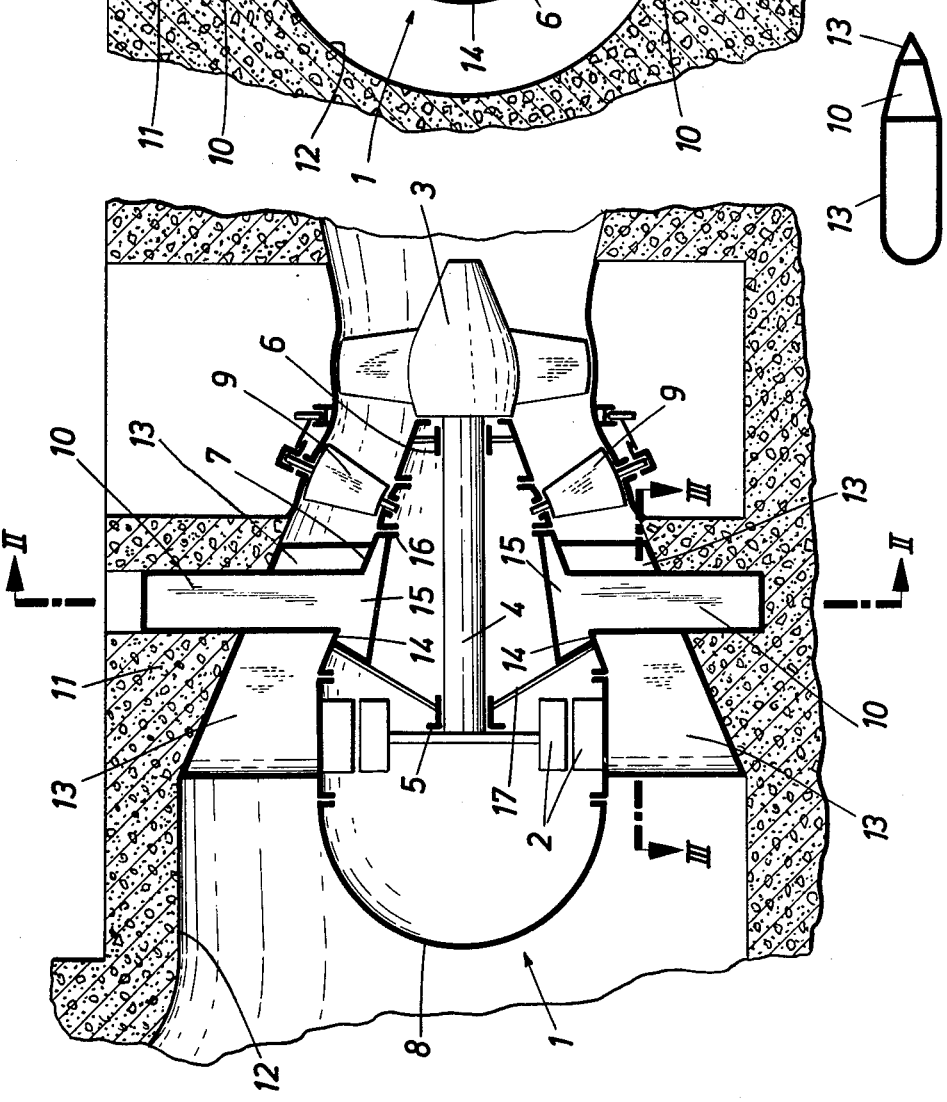
Figure 3:
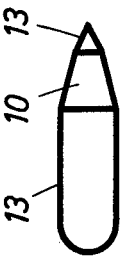

An embodiment of the invention is shown diagrammatically and by way of example on the drawing, in which FIG. 1 is an axial sectional view showing a turbine-generator assembly having a housing according to the invention, FIG. 2 is a transverse sectional view taken on line II—II in FIG. 1 and FIG. 3 is a sectional view taken on line III—III in FIG. 1.

A central assembly is generally designated 1 and comprises a generator 2, a turbine 3 with its turbine shaft 4, and a thrust bearing 5 and a radial bearing 6 for the shaft 4. The bearings 5 and 6 are disposed at the generator and turbine ends, respectively, of the shaft 4. The central assembly also comprises a housing 7, which at its end facing against the direction of flow of the driving water is closed by a generator fairing 8. Adjacent to the turbine, one end of each of the angularly adjustable guide vanes 9 is mounted in the housing 7. The housing 7 is supported by two radial arms 10 against a duct structure 11, which has an inside surface 12 that defines a flow passage for the driving water. The raidal arms 10 are provided in flow passage with fairing 13 and are anchored at their outer end in the duct structure 11 and are joined at their inner end inside the housing shell 14 to respective spars 15, which extend approximately in the same direction as the turbine shaft and adjoin the housing shell, which may be reinforced in this region. Each spar 15 is secured at its end near the turbine to an annular reinforcing flange 16 of the housing and is connected at its end portion near the generator to a bearing carrier 17, which carries the thrust bearing 5 for the turbine shaft 4. As a result, the arms 10, spars 15, housing shell 14, housing flange 16 and bearing carrier 17 are rigidly interconnected to constitute a flexurally stiff structure, which ensures that all forces and moments arising in the central assembly will be satisfactorily transmitted to the duct 11. For this reason the turbine housing 7 will be rigid even though it is light in weight and also has an unobstructed interior in which working is facilitated.

What is claimed is:

1. A turbine-generator assembly which is adapted to be installed in a duct structure defining a flow passage and comprises a central assembly including a shaft, a generator and a water turbine which are axially space apart and non-rotatably connected to said shaft, and bearing means for said shaft, and a housing assembly comprising a shell which surrounds said central assembly so that said turbine is adapted to receive water from said flow passage, at least two arms, each of which projects radially from said shell and has an outer end adapted to be anchored in said duct structure, and an inner end disposed inside said shell, a plurality of spars, each of which extends in said shell substantially parallel to the axis of said shaft and is rigid with the inner end of one of said arms and has a first end portion near said turbine and a second end portion near said generator, a peripheral reinforcing flange disposed in and rigid with said shell and said first end of each of said spars, and retaining means disposed in and rigid with said shell and said second end portion of each of said spars, whereby said arms are rigidly interconnected.

2. A turbine-generator assembly as set forth in claim 1, in which said bearing means comprise a thrust bearing disposed near said generator and said retaining means comprise a carrier for said thrust bearing.

3. A turbine-generator installation comprising a duct structure defining a flow passage a central assembly disposed in said flow passage and including a shaft, a generator and a water turbine which are axially spaced apart and non-rotatably connected to said shaft, and bearing means for said shaft, and a housing assembly comprising a shell which surrounds said central assembly so that said turbine is adapted to receive water from said flow passage, at least two arms, each of which projects radially from said shell and has an outer end anchored in said duct structure, and an inner end disposed inside said shell, a plurality of spars, each of which extends in said shell substantially parallel to the axis of said shaft and is rigid with the inner end of one of said arms and has a first end portion near said turbine and a second end portion near said generator, a peripheral reinforcing flange disposed in and rigid with said shell and said first end of each of said spars, and retaining means disposed in and rigid with said shell and said second end portion of each of said spars, whereby said arms are rigidly interconnected.

4. A housing assembly for a turbine-generator assembly which comprises a central assembly including a shaft, a generator and a water turbine which are axially spaced apart and non-rotatably connected to said shaft, and bearing means for said shaft, which housing assembly is adapted to be installed in a duct structure defining a flow passage and comprises a shell adapted to surround said central assembly so that said turbine is near one end and said generator is near the other end of said shell and said turbine is adapted to receive water from said flow passage, at least two arms, each of which projects radially from said shell and has an outer end adapted to be anchored in said duct structure, and an inner end disposed inside said shell, a plurality of spars, each of which extends in said shell substantially parallel to the axis of said shaft and is rigid with the inner end of one of said radial arms and has mutually opposite first and second end portions, which are respectively nearer to said one end and said opposite end of said shell, a peripheral reinforcing flange disposed in and rigid with said shell and with said first end of each of said spars, and retaining means disposed in and rigid with said shell and with said second end portion of each of said spars, whereby said radial arms are rigidly interconnected.

* * * * *